Nov. 22, 1927.
G. N. RANDLE
1,650,155
AUTOMOBILE COMMODE
Filed Dec. 7, 1926
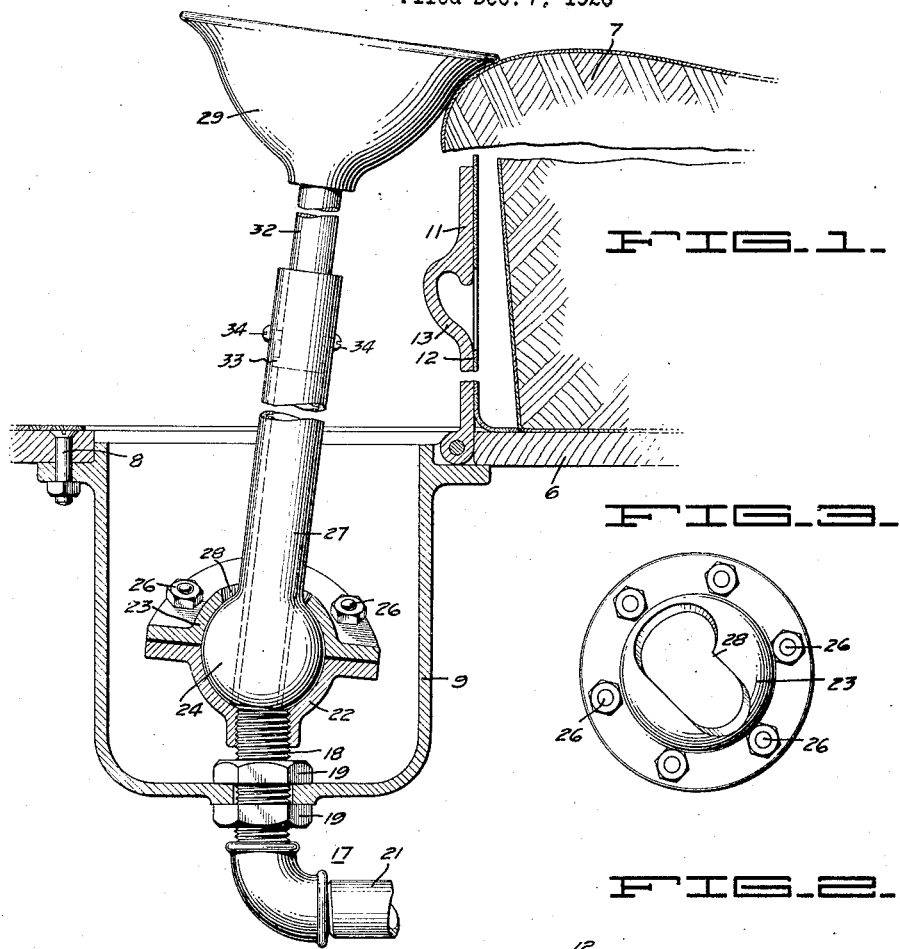
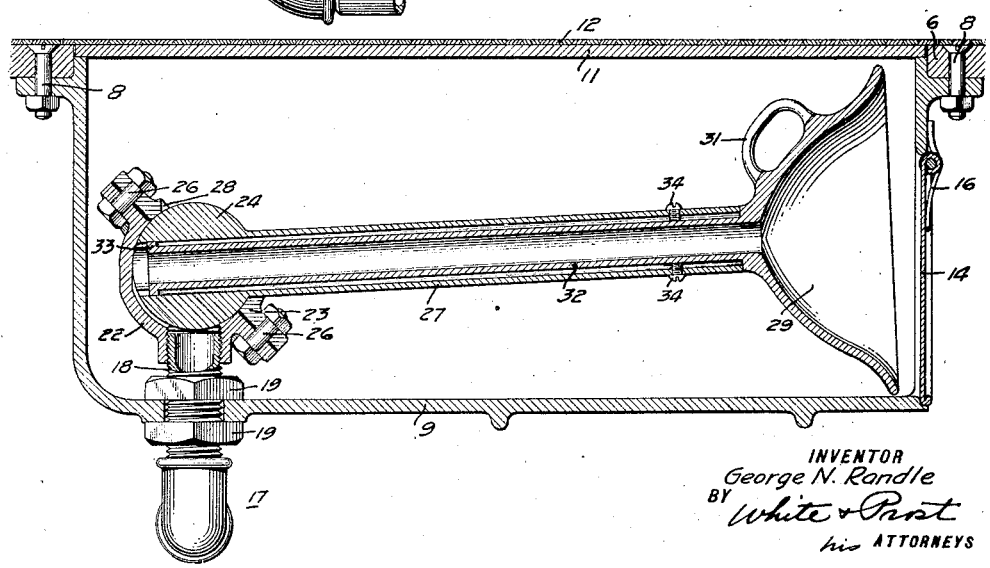
INVENTOR
George N. Randle
BY White & Prest
his ATTORNEYS Patented Nov. 22, 1927.

1,650,155

UNITED STATES PATENT OFFICE.

GEORGE N. RANDLE, OF OAKLAND, CALIFORNIA.

AUTOMOBILE COMMODE.

Application filed December 7, 1926. Serial No. 153,070.

My invention relates to a commode for attachment to an automobile for the use of the passengers thereof.

An object of my invention is to provide a compact device of the character described which is out of sight when not in use and is readily extended into position for use.

My invention possesses other advantageous features, some of which, with the foregoing, will be set forth at length in the following description where I shall outline in full that form of the automobile commode of my invention, which I have selected for illustration in the drawings accompanying and forming part of the present specification. In said drawings, I have shown one form of automobile commode embodying my invention, but it is to be understood that I do not limit myself to such form since the invention, as set forth in the claims, may be embodied in a plurality of forms.

In the drawings:

Fig. 1 is a cross section of a portion of an automobile with the commode of my invention installed therein, the plane of section being parallel to the longitudinal axis of the automobile.

Fig. 2 is a section of the commode of my invention as it is installed in an automobile, the plane of section being transverse of the automobile.

Fig. 3 is a plan of the upper half of the socket for the ball joint.

The device of my invention preferably comprises a basin attached by an extensible tube to a flexible connection supported by an automobile and adapted to be moved from a position below the floor of the automobile to a position adjacent the seat thereof.

In the embodiment of my invention disclosed in the drawings, the floor 6 of the automobile is provided in front of the seat 7 with an opening extending transversely of the vehicle. Mounted below the opening and secured to the floor by suitable fastenings 8, is a casing 9 made of any suitable material, such as cast metal, which forms a chamber below the floor and in communication with the interior of the vehicle thru the opening. A cover 11 is hinged to the casing 9 at one side thereof and when closed lies flush with the floor of the vehicle. A carpet 12, which covers the vehicle floor, preferably is suitably cut and attached to the cover 11 to follow the movement thereof. A handle 13 is recessed in the cover and is accessible thru an aperture cut in the carpet. One end of the casing 9 is provided with a door 14 hinged to the upper portion of the casing and normally maintained in closed position by means of a spring 16. The door 14 preferably extends slightly below the bottom of the casing 9 to allow for drainage and provides a means of easy access to the interior of the casing for cleaning purposes.

In the end of the casing opposite the door 14 a support for the basin of the commode is provided. The support also functions as an outlet pipe indicated generally by the numeral 17. The outlet pipe is preferably assembled from standard plumbing fittings and in the present instance comprises a threaded nipple 18 retained in place in the casing by means of jam nuts 19 situated on opposite sides of the bottom of the casing. An elbow connects the nipple to a drain pipe 21 leading to a suitable point of discharge, preferably at the rear of the vehicle.

The basin portion of the commode is advantageously movable in directions normal to each other and for that reason I have provided a ball joint to permit such movement. The ball joint comprises a casing made in two halves 22 and 23 enclosing a hollow sphere 24. The lower half 22 of the casing is threaded onto the nipple 18 while the hemispherical upper half 23 of the casing is attached to the lower half by means of nuts and bolts 26 which pass thru suitable flanges and clamp the two halves firmly together.

A tube 27 is attached to and extends diametrically from the sphere 24, the half 22 being relieved to permit communication between the nipple 18 and the tube. Since the tube preferably describes an arc of substantially 90° from a horizontal position within the casing to a nearly vertical position outside of the casing, the flanges on the two halves 22 and 23 are preferably inclined. The flanges lie in a plane which is substantially 45° to the horizontal in one direction and is inclined slightly in the direction normal to the first direction. The tube 27 is intended to be oscillated not only in a plane extending transversely of the automobile but also in a plane parallel with the longitudinal axis of the vehicle. As a guide for the movement of the tube, the upper half of the casing 23 is preferably provided with an irregularly shaped slot 28 of any desired contour, and preferably made as shown in Fig. 3. The tube in following the guide moves in a transverse plane from a horizontal to substantially a vertical position and then moves in a forward and aft plane to a correct position for use of the basin. The basin 29 is of a suitable shape provided with a handle 31 and is mounted at one end of a tube 32 which is of a diameter to slide freely within the tube 27. A flange 33 is provided at the lower end of the tube 32 and is stopped in extreme outward position by screws 34 provided in the sides of the tube 27.

The basin 29 normally lies in the position shown in Fig. 2, and is positioned for use as shown in Fig. 1. The cover 11 is opened by being grasped by the handle 13, and the basin is lifted to upright position by the handle 31. It is then properly rocked aft against the seat 7 with the simultaneous extension of the tube 32 from within the tube 27, if necessary. After use, the basin is returned to its normal position in the casing 9 beneath the floor. It is compactly stowed out of sight but is ready for instant use.

I claim:

1. An automobile commode comprising a casing adapted to be installed in the floor of said automobile, a ball joint on said casing, and a basin connected to said ball joint for movement into and out of said casing.

2. An automobile commode comprising a casing adapted to be installed in the floor of said automobile, a hollow ball joint on said casing, a telescoping conduit attached to said ball joint, and a basin connected to said conduit for movement into and out of said casing.

3. An automobile commode comprising a casing adapted to be installed in the floor of said automobile, a ball joint on said casing, and a basin connected to and extensible from said ball joint.

4. An automobile commode comprising a casing adapted to be installed in the floor of said automobile, a cover for the top of said casing, a door in one end of said casing, a ball joint in the opposite end of said casing, a telescoping conduit attached to said ball joint, and a basin on said conduit for movement into and out of said casing.

5. In an automobile having a floor and a laterally dislosed seat, a relatively long casing in front of and parallel to said seat, a hollow ball joint in said casing, an extensible conduit attached to said ball joint, and a basin on said conduit adapted in one position to lie lengthwise of said casing and in another position to extend upwardly out of said casing.

6. In an automobile having a floor and a laterally disposed seat, a relatively long casing in front of and parallel to said seat, an outlet pipe mounted on said casing, a hollow ball joint secured to said pipe, an extensible conduit attached to said ball joint, a basin on said extensible conduit, and means for guiding said basin from one position within said casing to another position adjacent said seat.

7. In an automobile having a floor and a laterally disposed seat, a relatively long casing in front of and parallel to said seat, a cover for the top of said casing, a door in one end of said casing, an outlet pipe adjacent the other end of said casing, a hollow ball joint mounted on said outlet pipe, a telescopic conduit attached to said ball joint, a basin on said conduit, and means for guiding the movement of said basin from a position lengthwise of said casing to another position out of said casing and adjacent said seat.

In testimony whereof, I have hereunto set my hand.

GEORGE N. RANDLE.